United States Patent [19]

Hungerford, Jr.

[11] Patent Number: 5,375,798
[45] Date of Patent: Dec. 27, 1994

[54] CONNECTOR FOR FACILITATING A CONNECTION BETWEEN A CHANNEL MEMBER AND A SUPPORT MEMBER

[76] Inventor: Charles S. Hungerford, Jr., 6 Beechwood Ct., Woodbury, Conn. 06798

[21] Appl. No.: 908,362

[22] Filed: Jul. 6, 1992

[51] Int. Cl.$^5$ .............................................. F16B 37/04
[52] U.S. Cl. ...................................... 248/58; 248/68.1; 411/85; 411/104
[58] Field of Search ......................... 248/49, 58, 68.1; 411/84, 85, 104, 432

[56] References Cited

U.S. PATENT DOCUMENTS

| | | | |
|---|---|---|---|
| 3,493,025 | 2/1970 | LaLonde et al. | 411/85 X |
| 3,494,646 | 2/1970 | Cumber | 411/85 X |
| 4,410,298 | 10/1983 | Kowalski | 411/104 X |
| 4,460,299 | 7/1984 | Kowalski | 411/104 X |
| 4,542,871 | 9/1985 | Fortsch | 248/68.1 X |
| 4,645,393 | 2/1987 | Pletcher | 411/84 |
| 4,950,099 | 8/1990 | Roellin | 411/85 X |

FOREIGN PATENT DOCUMENTS

| | | | |
|---|---|---|---|
| 188041 | 10/1922 | United Kingdom | 248/72 |
| 1061149 | 3/1967 | United Kingdom | 411/85 |

Primary Examiner—Richard K. Seidel
Assistant Examiner—Raymond D. Woods
Attorney, Agent, or Firm—Bachman & LaPointe

[57] ABSTRACT

A connector comprises first and second opposed, spaced apart locking lugs having first and second opposed, spaced apart faces between which the channel member is clamped. A flexible connection integral with the opposed faces of the locking lugs joins the locking lugs together in a unitary structure in a manner which allows for the space between the opposed faces of the locking lugs to be varied. The first and second locking lugs are provided with axially aligned bores which, when securing the connector to the channel member, receive a fastener for drawing the opposed faces of the locking lugs toward one another when the fastener is advanced into the axially aligned bores for clamping the channel member in between the opposed locking lugs of the connector.

8 Claims, 1 Drawing Sheet

U.S. Patent            Dec. 27, 1994            5,375,798
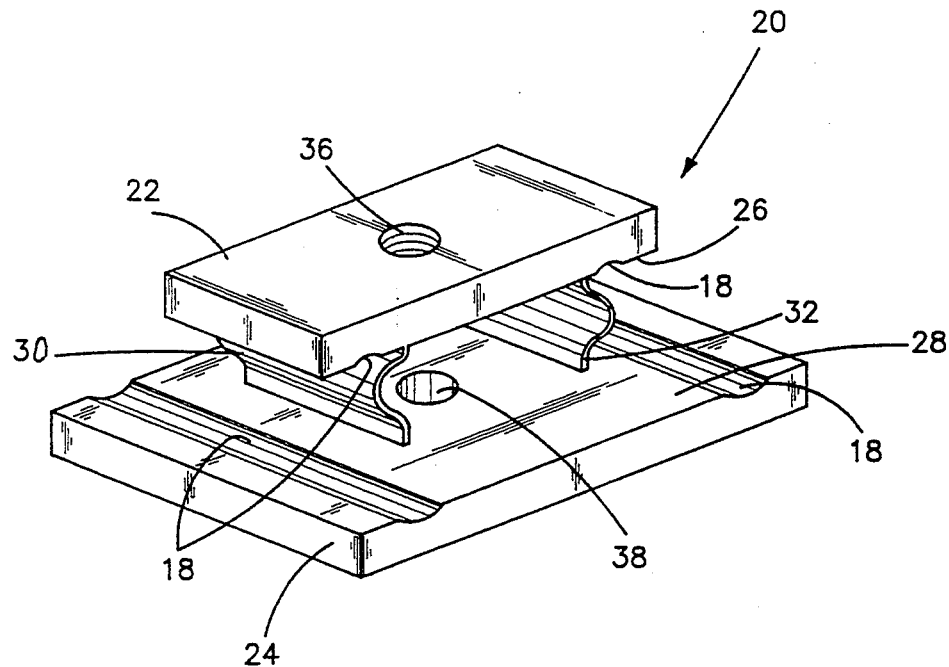
*FIG-1*
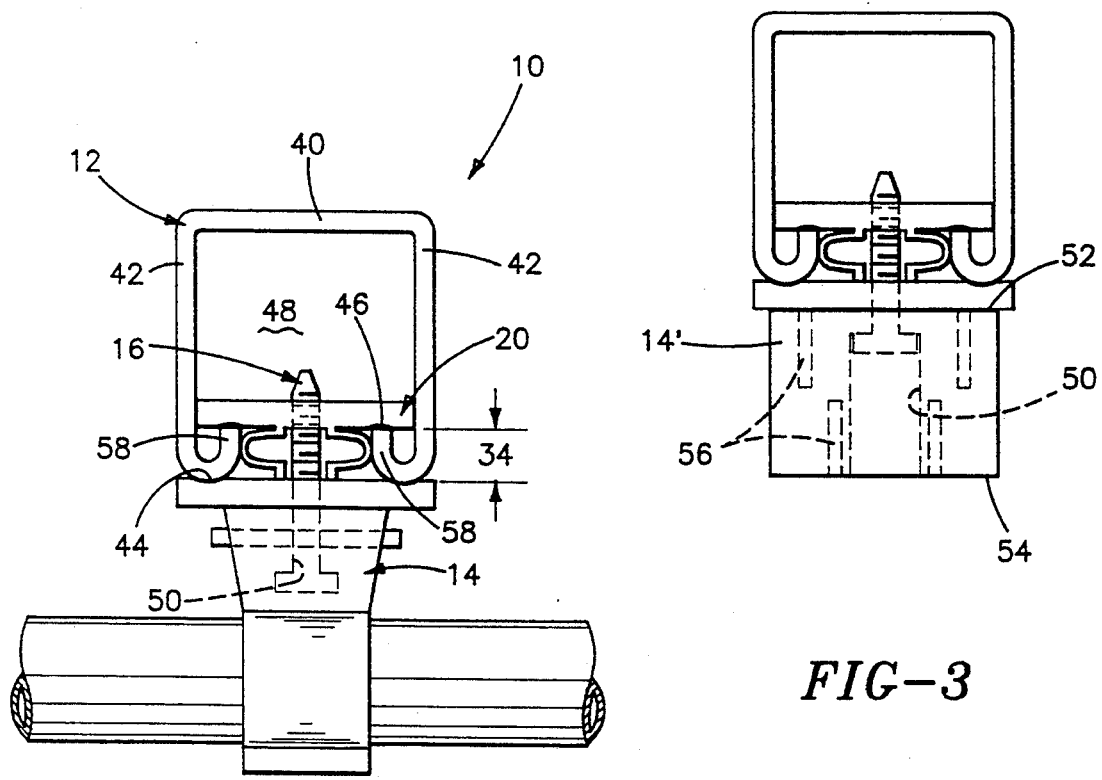
*FIG-2*            *FIG-3*

CONNECTOR FOR FACILITATING A CONNECTION BETWEEN A CHANNEL MEMBER AND A SUPPORT MEMBER

BACKGROUND OF THE INVENTION

The present invention relates to connector devices and, more particularly, to connector devices useful for facilitating a connection between a structural channel member and a support member.

It is well know in the prior art to support pipes, cables and the like from construction channel members by means of a support member secured to the channel by a connector device. A particularly useful connector device is disclosed in Applicant's previously issued U.S. Pat. No. 4,662,590, issued May 5, 1987. The connector device disclosed in U.S. Pat. No. 4,662,590 is particularly useful for supporting a pipe clamp of the type disclosed in U.S. Pat. Nos. 4,291,855 and 4,955,574 from a structural channel member.

Construction channel members of the type disclosed in the aforementioned patents are manufactured in various sizes, shapes and materials. The connector device disclosed in U.S. Pat. No. 4,662,590 is particularly useful in combination with channel members formed of metal material. It has been found, however, when using channel members formed of less rigid materials such as plastic or the like, that the connector device of U.S. Pat. No. 4,662,590 is not particularly useful.

Naturally, it would be highly desirable to provide a connector device for facilitating a connection between a channel member and a support member which is readily usable with any type of construction member regardless of the material from which the channel member is made.

Accordingly, it is the principal object of the present invention to provide a connector device for facilitating a connection between a channel member and a support member.

It is a particular object of the present invention to provide a connector as aforesaid which is usable with channel members formed of various materials.

It is a further object of the present invention to provide a connector as aforesaid which is adapted for use with a support member which can readily receive threaded rod.

Further objects and advantages of the present invention will become clear hereinbelow.

SUMMARY OF THE INVENTION

In accordance with the present invention the foregoing objects and advantages are readily obtained.

The present invention is drawn to a connector for facilitating a connection between a channel member and a support member regardless of the material from which the channel member is formed. In accordance with the present invention, the connector comprises first and second opposed, spaced apart locking lugs having first and second opposed, spaced apart faces between which the channel member is clamped. A flexible connection integral with the opposed faces of the locking lugs joins the locking lugs together in a unitary structure in a manner which allows for the space between the opposed faces of the locking lugs to be varied. The first and second locking lugs are provided with axially aligned bores which, when securing the connector to the channel member, receive a fastener for drawing the opposed faces of the locking lugs toward one another when the fastener is advanced into the axially aligned bores for clamping the channel member in between the opposed locking lugs of the connector.

In accordance with a further feature of the present invention, the support member used in combination with the connector for facilitating a connection between the channel member and the support member comprises a block member provided with a bore having an axis extending from a first surface thereof to a second surface thereof. The block is provided on the first and second surfaces with at Least one tapped threaded hole extending along the axis of the through bore for receiving threaded rod for mounting a further support member such as threaded rod. When assembled with the channel member and connector, the support member is fixed to the second locking lug of the connector while the first locking lug of the connector is fixed within the channel member.

By providing a connector as set forth above, the flexibility and resiliency of the side wall portions of the channel member have no effect on the ability of the connector member to be fixed within the channel of the channel member and thus, the connector of the present invention is suitable for use with channel members formed of any desired material.

Other features and advantages of the present invention will become more apparent from an examination of the following specification when read in conjunction with the drawings.

BRIEF DESCRIPTION OF THE DRAWINGS

FIG. 1 is a perspective view of the connector device in accordance with the present invention.

FIG. 2 is a side elevation, partially sectioned view, showing the connector device of the present invention assembled to a channel member and supporting a support member of the type disclosed in U.S. Pat. Nos. 4,291,855 and 4,955,574.

FIG. 3 is a side elevation, partially sectioned view, showing the connector device assembled to a channel member and supporting a support member particularly useful for connecting threaded rod thereto.

DETAILED DESCRIPTION

Referring to FIGS. 1 through 3, the connector of the present invention will be disclosed in detail and in combination with the improved support member for supporting threaded rod in accordance with the present invention.

With reference to the drawings, FIGS. 2 and 3 illustrate a structural assembly 10 comprising in combination a channel member 12, a support member 14, 14' and a connector 20 for connecting the support member 14, 14' to the channel member 12 by means of a fastener 16.

With reference to FIG. 1, the connector 20 comprises first and second opposed, spaced apart locking lugs 22 and 24 having first and second spaced apart faces 26 and 28 respectively. As shown in FIG. 1, the first and second opposed locking lugs 22 and 24 are joined together by means of flexible strips 30 and 32 which are formed integral with the opposed locking lugs so as to form together therewith a unitary structure having a space between the opposed faces 26 and 28 of the locking lugs 22 and 24, respectively. In accordance with the present invention, the connector is manufactured as a unitary single piece formed, preferably of nylon or the like, wherein the strips 30 and 32 are flexible so as to allow for the space 34 between the locking lugs 22 and 24 to be varied in a manner to be described hereinbelow. Each of the locking lugs 22 and 24 are provided with a bore 36 and 38 lying along a common axis. In accordance with the present invention the locking lug 22 which is adapted to be received within a channel member (to be described hereinbelow) is provided with a threaded bore 36 for receiving the fastening member 16 in a manner to be described. In accordance with the present invention the strips 30 and 32 are opposed to each other and are disposed on either side of the axis defined by the axially aligned bores 36 and 38 provided in the locking lugs 22 and 24. In accordance with the present invention, each of the opposed faces 26 and 28 of the locking lugs 22 and 24 may be provided with detents 18 adapted to mate with the construction channel member 12 in a manner described below.

With reference to FIGS. 2 and 3, the assembly of the connector 20 with the channel member 12 and support member 14, 14' will be described. The channel member 12 comprises a top wall 40 having a pair of continuous contiguous side walls 42. Each side wall 42 is provided with a return bend portion 44 and a termination end portion 46 which lies within the channel space 48 defined by side walls 42 and top wall 40.

With reference to FIGS. 2 and 3, the operation of the connector of the present invention will be discussed in detail. The support members 14, 14' are provided with a through bore 50 having an axis extending from one surface thereof to a second surface thereof. In the case of the support member schematically shown in FIG. 2, a suitable support member 14 is of the type disclosed in U.S. Pat. No. 4,291,855 which is incorporated herein by reference. The support member 14' illustrated in FIG. 3 is particularly useful for use in supporting threaded rod therefrom. In accordance with FIG. 3, the support member 14' is provided with a through bore 50 extending from a first surface thereof to a second surface thereof, 52 and 54 respectively. In accordance with the present invention, each of these surfaces, 52 and 54, are provided with a plurality of tapped threaded holes 56 extending substantially parallel to the axis of the through bore 50. In accordance with the present invention, the tapped threaded holes 56 are adapted to receive different sized threaded rod. The support member 14' may be oriented in two operational positions when assembled so as to expose one or the other surfaces 52 and 54 to be used for receiving threaded rod.

In order to facilitate a connection between channel member 12 and support members 14, 14', the first locking lug 22 of the connector 20 is located within the space 48 of the channel member 12 such that the face 26 of the locking lug 22 lies on the end portions 46 of the side walls 42. The flexible strips 30 and 32 lie in a space defined by the turned up side wall portions 58. Fastener 16 is received in through bore 50 of the support members 14, 14' and axial bores 36 and 38 of the locking lugs 22 and 24 of the connector 20. The fastener 16 is threaded so as to be threaded into the threaded bore 36 provided in locking lug 22. As the fastener is advanced into the threaded bore 36 of locking lug 22 the locking lugs 22 and 24 are drawn together for clamping the channel member between the opposed faces 26 and 28 thereof, thereby securing the connector and correspondingly the support member 14, 14' to the channel member 12.

As can be seen from the foregoing, the connector is suitable for use with any channel member having the required return bend portion and the flexibility of the side walls relative to the top wall does not affect the ability of the connector to be secured to the channel member. Thus, the connector of the present invention is suitable for use with channel members formed of any type of material including metal, plastic and the like.

In accordance with a further feature of the present invention the opposed faces 26 and 28 of the locking lugs 22 and 24 may be provided with detent means 18 which are adapted to mate with the return bend portion 44 and the termination end portion 46 of the side walls 42 for locating the connector within channel member 12.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A connector for facilitating a connection between a channel member and a support member comprising:
   first and second opposed, spaced apart locking lugs having first and second opposed, spaced apart faces; flexible means integral with said opposed faces of said locking lugs for joining said locking lugs together in a unitary structure such that the space between the opposed faces of said locking lugs is adjustable; and axially aligned bore means provided in said first and second locking lugs.

2. A connector according to claim 1 wherein one of said axially aligned bore means is threaded.

3. A connector according to claim 1 wherein said flexible means comprises first and second opposed flexible straps disposed on either side of an axis defined by said axially aligned bore means.

4. A connector according to claim 1 wherein at least one of said opposed faces of said locking lugs is provided with detent means.

5. In combination, a channel member, a connector for facilitating a connection between the channel member and a support member, and a fastener for locking said connector to said channel member; said channel member comprises a top wall contiguous with two side walls, each side wall having a return bend portion and a termination end portion; said connector comprises first and second opposed, spaced apart locking lugs having first and second opposed, spaced apart faces, flexible means integral with said opposed faces of said locking lugs for joining said locking lugs together in a unitary structure such that the space between the opposed faces of said locking lugs is adjustable, and axially aligned bore means provided in said first and second locking lugs; and said fastener comprises means received within said axially aligned bore means for adjusting said opposed faces of said locking lugs toward one another wherein said first opposed locking lug lies on said end portion of each side wall and said second opposed locking lug lies on said return bend portion for clamping said channel member between said opposed faces.

6. The combination of claim 5 wherein one of said axially aligned bore means is threaded.

7. The combination of claim 5 wherein said flexible means comprises first and second opposed flexible straps disposed on either side of an axis defined by said axially aligned bore means.

8. The combination of claim 5 wherein at least one of said opposed faces of said locking lugs is provided with detent means for mating with one of said return bend portion and said termination end portion.

* * * * *